(12) United States Patent
Zakheos

(10) Patent No.: US 9,581,130 B2
(45) Date of Patent: Feb. 28, 2017

(54) APPARATUS FOR GENERATING ENERGY FROM WAVES

(76) Inventor: Adam Zakheos, Plymouth (GB)

( * ) Notice: Subject to any disclaimer, the term of this patent is extended or adjusted under 35 U.S.C. 154(b) by 380 days.

(21) Appl. No.: 13/994,172

(22) PCT Filed: Nov. 28, 2011

(86) PCT No.: PCT/GB2011/001654
§ 371 (c)(1),
(2), (4) Date: Jun. 14, 2013

(87) PCT Pub. No.: WO2012/080687
PCT Pub. Date: Jun. 21, 2012

(65) Prior Publication Data
US 2013/0255247 A1 Oct. 3, 2013

(30) Foreign Application Priority Data
Dec. 16, 2010 (GB) .................................. 1021381.7

(51) Int. Cl.
F03B 13/20 (2006.01)
F03B 13/18 (2006.01)

(52) U.S. Cl.
CPC ............ *F03B 13/20* (2013.01); *F03B 13/188* (2013.01); *F05B 2240/311* (2013.01); *F05B 2240/93* (2013.01); *F05B 2240/98* (2013.01); *Y02E 10/38* (2013.01)

(58) Field of Classification Search
CPC ....................... F03B 13/12–13/24; Y02E 10/38
USPC .................................. 60/495–507; 290/42, 53
See application file for complete search history.

(56) References Cited

U.S. PATENT DOCUMENTS

| 3,335,667 A * | 8/1967 | Murphy ................ F03B 13/188 405/76 |
| 3,758,788 A | 9/1973 | Richeson |
| 4,210,821 A * | 7/1980 | Cockerell ........................ 290/53 |
| 4,404,490 A | 9/1983 | Taylor et al. |
| 4,475,535 A * | 10/1984 | Assaf ............................. 126/568 |
| 4,731,544 A * | 3/1988 | Jones .................... F03B 13/188 290/42 |
| 4,781,023 A * | 11/1988 | Gordon ................... F03B 13/20 290/42 |
| 6,435,849 B1 * | 8/2002 | Guilmette ...................... 417/472 |
| 6,476,511 B1 | 11/2002 | Yemm et al. |
| 6,709,587 B1 * | 3/2004 | Guilmette .................. 210/242.3 |

(Continued)

FOREIGN PATENT DOCUMENTS

DE 102008050238 A1 4/2010
FR 2470264 A1 * 5/1981
(Continued)

*Primary Examiner* — Thomas Denion
*Assistant Examiner* — Laert Dounis
(74) *Attorney, Agent, or Firm* — Jason Saunders; Arnold, Knobloch & Saunders, L.L.P.

(57) ABSTRACT

An apparatus for generating energy from the action of waves in a body of water is provided, the apparatus comprising a flexible planar member for extending across the surface of the body of water, the flexible member having a lower surface which, in use, is in contact with the surface of the water; an energy generating system coupled to a portion of the flexible member, the energy generating system operable to generating energy from the movement of the portion of the flexible member.

16 Claims, 4 Drawing Sheets

(56) References Cited

U.S. PATENT DOCUMENTS

| | | | |
|---|---|---|---|
| 8,429,910 B2 * | 4/2013 | Ghouse | F03B 13/1815 |
| | | | 417/100 |
| 2008/0267712 A1 | 10/2008 | Jean et al. | |
| 2010/0019498 A1 | 1/2010 | Pollack et al. | |
| 2011/0116942 A1 * | 5/2011 | Duffy | F03B 13/188 |
| | | | 417/331 |

FOREIGN PATENT DOCUMENTS

| | | |
|---|---|---|
| GB | 2060082 A | 4/1981 |
| GB | 2242939 A | 10/1991 |
| GB | 2384031 A | 7/2003 |
| GB | 2486479 B | 6/2014 |
| WO | 20001017519 A1 | 3/2000 |
| WO | 2009/138805 A1 | 11/2009 |
| WO | 2010104487 A1 | 9/2010 |
| WO | 2011/022726 A2 | 2/2011 |
| WO | 2012080687 A1 | 6/2012 |

* cited by examiner

APPARATUS FOR GENERATING ENERGY FROM WAVES

The present invention relates to an apparatus for generating energy from the action of waves on a body of water, such as a sea or lake.

Apparatus for the generation of energy from the movement of water, in particular the generation of so-called 'wave energy', are well known in the art and have many forms. In general, a significant number of the known systems operate on one of two principles. The first principle of operation is the use of movement of the water itself to drive an energy generating device, either directly or indirectly. A second principle of operation is the generation of energy by the movement of a first floating device relative to second, typically relatively fixed, device.

An example of a device operating on the second principle is disclosed in WO 00/017519. The device comprises a plurality of buoyant cylindrical bodies arranged end to end. A coupling is arranged between adjacent bodies, such that energy may be generated from relative movement of the adjacent bodies due to the action of incident waves. It would appear that this system requires the buoyant bodies to be arranged in a particular orientation with respect to the incident waves, in order for the waves to induce the required relative movement between the adjacent bodies. This is potentially a shortcoming in this device.

An alternative system for the generation of energy from wave motion is the so-called 'wave blanket'. This system comprises a plurality of pneumatic chambers arranged into two or more layers to form a flexible membrane. The chambers are compressed and subsequently allowed to relax under the action of an incident wave. This induces a flow in fluid between the chambers, from which energy is generated by a turbine or the like. The fluid in the chambers may be compressible, to avoid undue stresses arising in the walls of the chambers, leading to ruptures. The chambers are longitudinal and are arranged in parallel. The system operates at high efficiency when the incident waves are moving perpendicular to the longitudinal chambers. However, it appears that the efficiency of the system reduces significantly when the incident waves are travelling at other angles to the chambers, in particular parallel to the longitudinal axes of the chambers.

FR 2470264 discloses a system for converting wave energy. The system comprises a flexible membrane carrying a plurality of plates thereon, each plate having a cable for transferring wave motion to a hydraulic piston and cylinder disposed beneath the surface.

WO 2011/022726 discloses a marine energy extraction system, the system having a plurality of hydraulic power cells for capturing and dissipating energy from a wave.

GB 2,384,031 discloses a flexible beam having two sets of parallel, rigid panels. An elastic medium extends between the two sets of panels. The beam further comprises pumping means to pump a fluid when the beam is flexed.

U.S. Pat. No. 4,404,490 concerns a system for generating energy from wave motion. The system comprises one or more laminate sheets of piezoelectric material, each sheet having an electrode on each opposing surface thereof. The piezoelectric elements may be flexible.

US 2010/0019498 discloses a wave energy converter comprising an elongated elastic tube extending at least partially parallel to the direction of propagation of the waves. The tube stretches and relaxes a synthetic flexible material, which in turn generates electricity as the degree of stretch changes.

There is a need for an improved apparatus for generating energy from the action of waves. In particular, it would be advantageous if the apparatus could operate without needing to be aligned with the direction of incident waves and generate energy regardless of the angle at which incident waves arrive at the apparatus.

It has now been found that energy may be generated from the action of waves in a body of water by an apparatus comprising a flexible planar member extending across the surface of the body of water, such that portions of the flexible member are caused to move under the action of incident waves travelling at any angle to the apparatus. Energy may be generated from the movement of the portions of the flexible member.

According to the present invention, there is provided an apparatus for generating energy from the action of waves in a body of water, the apparatus comprising:

a flexible planar member for extending across the surface of the body of water, the flexible member having a lower surface which, in use, is in contact with the surface of the water;

an energy generating system coupled to a portion of the flexible member, the energy generating system operable to generate energy from the movement of the portion of the flexible member.

The apparatus of the present invention is disposed at the surface of the body of water. The apparatus generates energy from movement in the apparatus induced by the action of waves passing beneath the apparatus. In particular, energy may be generated by one or a plurality of separate portions of the apparatus moving under the action of incident waves, with means being provided to generate energy from the movement of the portions. A particular feature of the apparatus of this invention is that the apparatus is designed to stay in close contact with the surface of the water, as described in more detail hereinafter. This allows the apparatus to respond more fully to the action of the waves and to be more efficient in the generation of energy from the wave motion.

The apparatus of the present invention comprises a flexible planar member. The flexible member extends across the surface of the water. The flexible member is planar. In this respect, the term 'planar' is a reference to the member extending across the surface of the water a substantial distance in two directions, so as to cover an area of the surface of the water. In particular, the planar member is able to respond to incident waves from all angles, such that the waves induce relative movement in separate portions of the member, regardless of the angle of incidence of the waves. In this respect, the apparatus of the present invention is distinguished from a substantially linear arrangement of bodies or members as employed in some prior art systems. Such substantially linear arrangements require orienting with respect to the direction of travel of the incident waves in order to operate in an efficient manner. The apparatus of the present invention is not required to be oriented in such situations. In this way, the apparatus is able to generate energy from incident waves that are moving at any angle to the apparatus.

The flexible member may be any suitable shape and configuration, such that it responds to the motion of the incident waves. In one embodiment, the flexible member is substantially circular in plan view. However, other shapes and forms may be employed, such as square, rectangular, and the like.

The flexible member may consist of a single flexible assembly, with energy being generated from the movement of different portions of the single flexible assembly. Alternatively, the flexible member may comprise an array of a plurality of flexible assemblies linked together, with energy being generated from the movement of portions of different flexible assemblies. Such an array may be preferred when constructing large embodiments of the apparatus of the present invention, allowing the complete flexible member to be constructed in a modular fashion.

As noted above, the flexible member is moved by the action of the incident waves. In particular, the flexible member follows the movements in the surface of the water, thereby inducing corresponding movements in the flexible member. Energy is then generated from the movement of spaced apart portions of the flexible member, as described in more detail below. Accordingly, the flexible member may have any suitable construction that allows the member to remain in contact with and follow the movement of the surface of the water.

The apparatus of the present invention is buoyant, such that it remains at the surface of the body of water. The apparatus preferably has neutral buoyancy at the surface of the water, such that the apparatus is maintained with the lower surface of the flexible member at or, more preferably, below the surface of the water. In this way, the ingress of air between the surface of the water and the flexible member is reduced or prevented.

To provide the requisite buoyancy, the apparatus may comprise any suitable buoyant means or member. In one embodiment, the flexible member is buoyant, such that it floats at the surface of the water. The buoyant flexible member may be supplemented with other buoyant bodies or members, to aid in keeping the apparatus at the surface of the water. In one embodiment, the flexible member comprises a planar buoyant member extending at least partially, more preferably substantially entirely, across the flexible member. The buoyant member may be formed from a suitably buoyant material, such as a closed-cell foam or the like. Alternatively, the buoyant member comprises one or more buoyancy chambers, in particular gas-filled chambers, preferably air-filled chambers. The buoyant member is most preferably flexible, so as to allow for and follow the movement of the flexible member under the action of the incident waves. The buoyant member preferably forms a layer of the flexible member.

The apparatus may also be provided with ballast. This is particularly preferred, to keep the flexible member in contact with the surface of the body of water, allowing it to more closely follow the movement of the surface as waves pass the apparatus. The ballast is preferably provided in the flexible member. Any suitable means for ballasting the flexible member may be provided. In one preferred embodiment, the flexible member is provided with one or more ballast chambers extending at least partially, more preferably substantially entirely, across the flexible member. The ballast chamber may contain any suitable material to provide the requisite ballast. A particularly preferred material is water, in particular water from the body of water in which the apparatus is deployed. The ballast chamber may be closed, that is contain a single charge of ballast material. More preferably, the ballast chamber is provided with openings to allow water to enter the chamber and ensure that the chamber is filled with water.

A particularly preferred arrangement is one in which the flexible member comprises one or more buoyancy chambers extending in a first layer of the flexible member, and one or more ballast chambers extending in a second layer of the flexible member. In use, the apparatus is most preferably deployed to have the second layer of the flexible member below the first and in contact with the surface of the water. More particularly, the apparatus is preferably arranged to have buoyancy that maintains the buoyancy chamber at the surface of the water and the lower surface of the ballast chamber below the water surface. In this way, the ingress of air between the surface of the water and the ballast chamber is reduced or prevented.

The apparatus preferably comprises means to prevent water and waves washing onto the upper surface of the flexible member. Suitable means include a barrier to prevent water washing onto the flexible member. The barrier may comprise one or more bodies, such as cylindrical bodies, attached to the edge of the flexible member. The bodies are preferably buoyant.

As noted above, the apparatus of the present invention is particularly efficient by having the flexible member able to remain in close contact with the surface of the water, thereby allowing it to closely follow the movement of the water surface as it is moved by the wave action. The apparatus preferably comprises means for retaining the flexible member in contact with the surface of the water, yet still free to move under the action of the incident waves.

In one embodiment, the apparatus comprises means to prevent the ingress of air between the surface of the water and the lower surface of the flexible member. Any suitable means may be provided. In one embodiment, the apparatus is provided with a skirt extending from the edge portion of the flexible member into the body of water. The skirt allows the edge portions of the flexible member to lift, without allowing air to enter between the water surface and the flexible member. The skirt may be of any suitable arrangement. The skirt is preferably flexible. The depth of the skirt may be determined by the expected height of incident waves and the tendency of the edge portions of the flexible member to lift from the water surface under the action of the waves.

Further, to keep the flexible member in contact with the surface of the water, means may be provided to remove any air that becomes trapped between the surface of the water and the under side of the flexible member. Suitable means include providing one or more valves in the flexible member, to allow trapped air to be removed.

Alternatively, or in addition, means may be provided to provide water to the underside of the flexible member, so as to displace air present between the flexible member and the water surface. Suitable means include a pump and valve assembly.

As noted above, the apparatus of the present invention generates energy from the movement of one or more portions of the flexible member induced by the action of incident waves. Any suitable means may be employed for generating energy from such movement. Suitable means include turbines and hydraulic pumps, operable by movement of the aforesaid portions of the flexible member. Suitable means are known in the art. The power generation means may be deployed in any suitable location relative to the apparatus, for example above below or remote therefrom, for example being submerged below the apparatus. The power generation means is connected to the flexible member by a suitable connection to form a take-off assembly.

The power generation means is connected to one or more portions of the flexible member and is operated by movement thereof, for example the movement of a single portion or the relative movement between the two. Any suitable connection to the flexible member may be employed. Preferably, the flexible member is provided with a plurality of spaced apart rigid portions, to which the power generation means may be connected. In one embodiment, each portion of the flexible member is provided with a platform thereon, preferably comprising an upper and lower plate, extending across a portion of the upper and lower surface of the flexible member. In this way, the flexible member is provided with a plurality of spaced apart rigid platforms. Energy is generated from the movement of the rigid platforms.

The connection to the rigid portions of the flexible member, that is the take-off assembly, may be either from above or below the flexible member.

Embodiments of the present invention will now be described, by way of example only, having reference to the accompanying drawings, in which.

Figure 1:
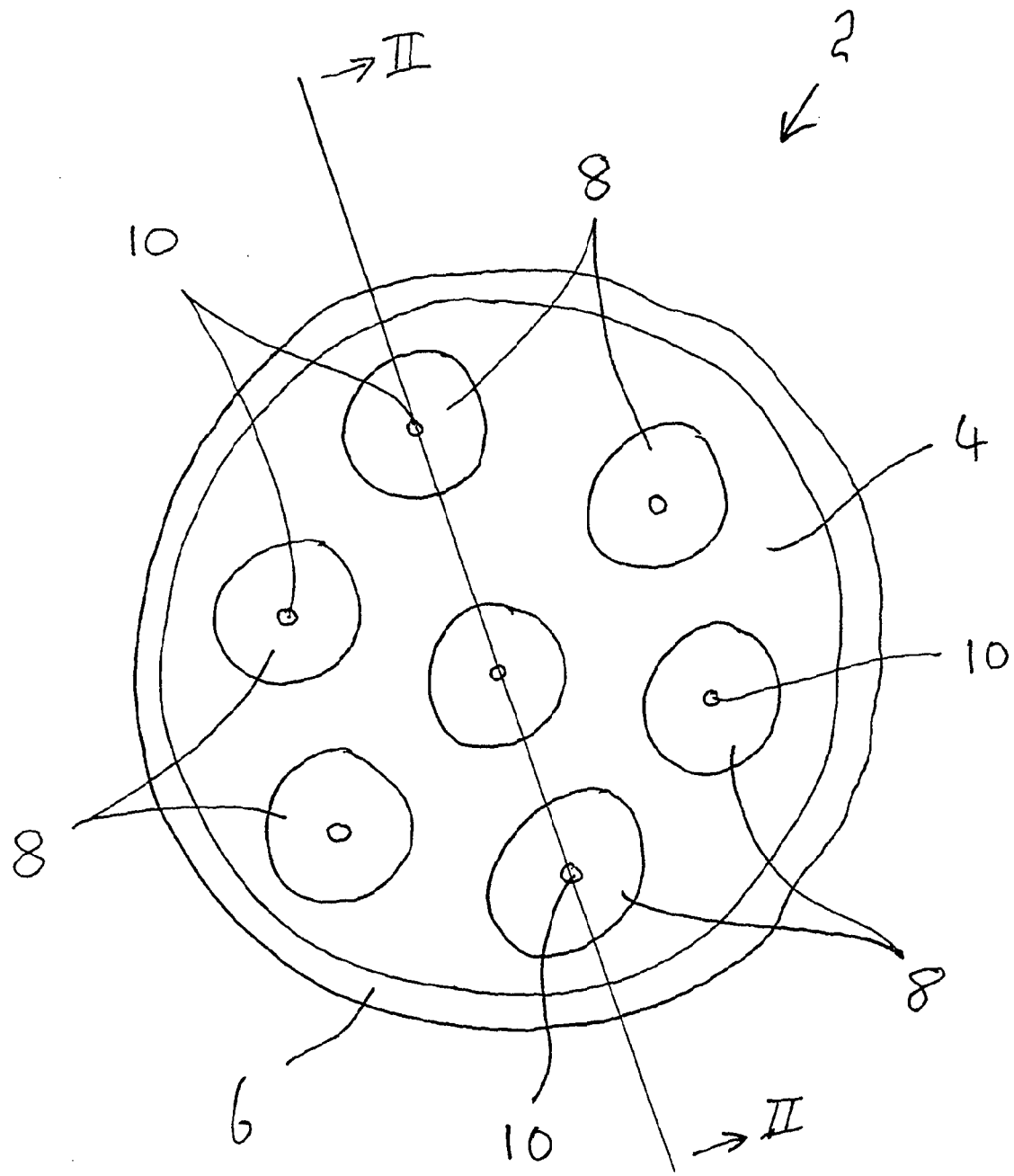
FIG. 1 is a plan view of an apparatus according to one embodiment of the present invention.

Turning to FIG. 1, there is shown a plan view of an apparatus according to one embodiment of the present invention, generally indicated as 2. The apparatus 2 comprises a generally circular flexible member 4, surrounded at its edge by a generally cylindrical buoyant barrier 6. The flexible member 4 is provided with a plurality of spaced apart rigid platforms 8. Each platform 8 is provided with a coupling 10, for connecting to a suitable means for generating energy from movement of the platform. Details of the apparatus are shown in more detail in FIGS. 2 and 3.

The apparatus 2 of FIG. 1 is able to respond to and generate energy from waves travelling at all directions relative to the apparatus. Thus, waves travelling at any angle to the apparatus 2 will induce relative movement between the platforms 8 displaced around and across the flexible member. The apparatus 2 may be deployed singularly or as an array comprising a plurality of the apparatus.

Figure 2:
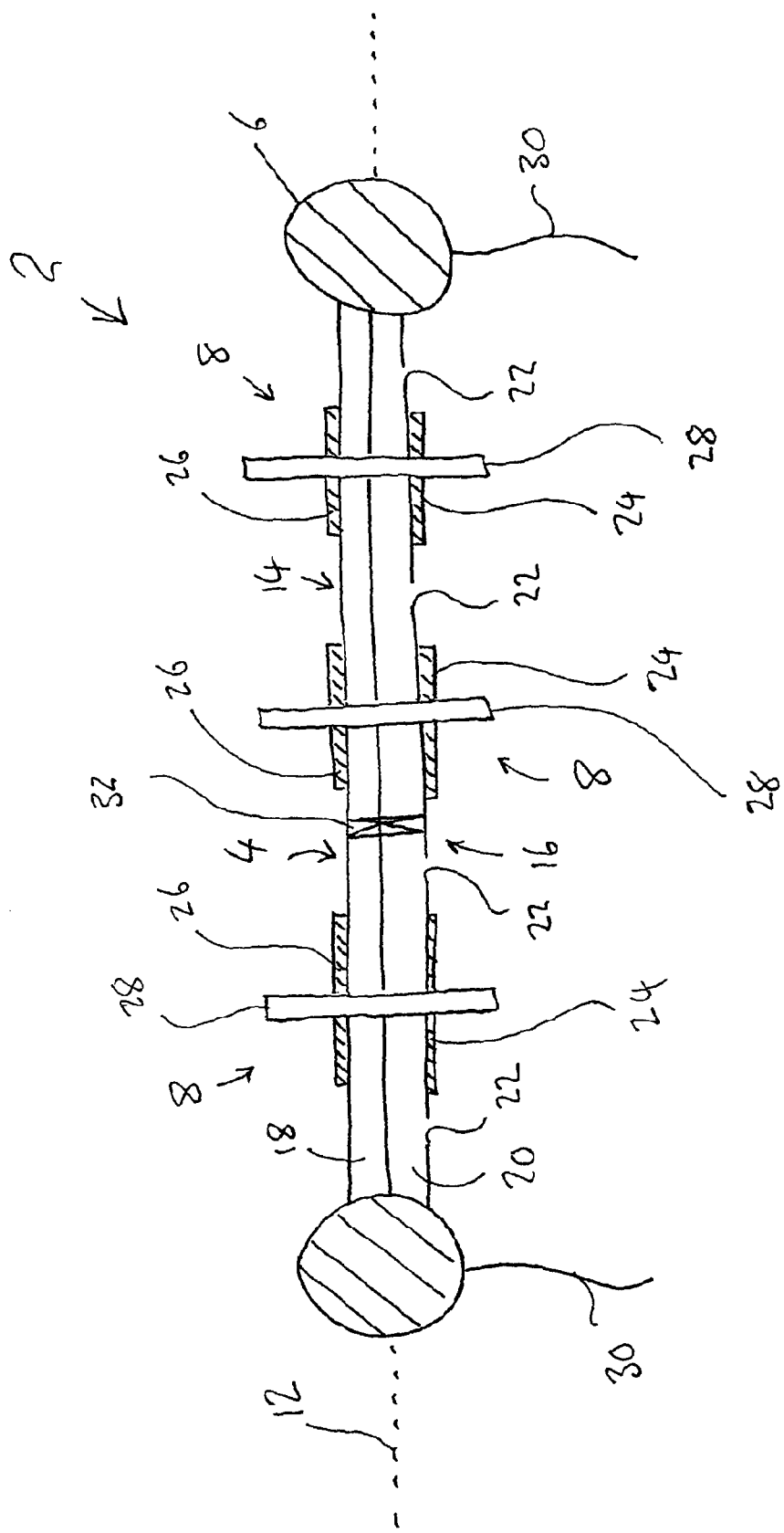
FIG. 2 is a cross-sectional side view of the apparatus of FIG. 1 along the line II-II.

Turning to FIG. 2, there is shown a cross-sectional view of the apparatus 2 of FIG. 1. The surface of a body of water is indicated by the dotted line 12. As shown, the apparatus 2 is disposed at the surface 12 of the water, with the flexible member 4 in contact with the surface 12 across its underside.

The flexible member 4 comprises an upper layer 14 and a lower layer 16, as viewed in FIG. 2. The upper layer 14 comprises a buoyancy chamber 18 extending across the flexible member within the buoyant barrier 6. The chamber 18 is filled with a gas, most conveniently air, and provides the flexible member and apparatus with buoyancy. Means, such as a pump or the like (not shown for clarity) may be provided to maintain the chamber 18 inflated and full of air or to regulate the buoyancy of the apparatus. The lower layer 16 of the flexible member 4 comprises a ballast chamber 20, extending across the flexible member within the buoyant barrier 6. The ballast chamber 20 contains a suitable ballast material, most conveniently water. The ballast chamber is provided with a plurality of openings 22, through which water can enter the ballast chamber and keep it filled.

As noted above, the apparatus 2 comprises a plurality of spaced apart rigid platforms 8. As shown in FIG. 2, each platform 8 comprises a lower plate 24, extending across the lower surface of the ballast chamber 20, and an upper plate 26, extending across the upper surface of the buoyancy chamber 18. A rod 28 extends between the upper and lower plates of each platform 8 and provides a means for the coupling 10, for connection to a suitable power generation system.

As shown in FIG. 2, the apparatus is provided with a skirt 30 extending down from the buoyant barrier 6 into the water. The skirt prevents air entering the apparatus between the lower surface of the lower layer 16 of the flexible member 4 and the surface 12 of the water. In this way, the flexible member 4 is maintained in close contact with the surface 12 of the water, allowing it to more efficiently move under the action of the waves.

Should air enter the apparatus between the flexible membrane 4 and the surface 12 of the water, it may be removed through a one-way valve 32, disposed in the flexible member.

Figure 3:
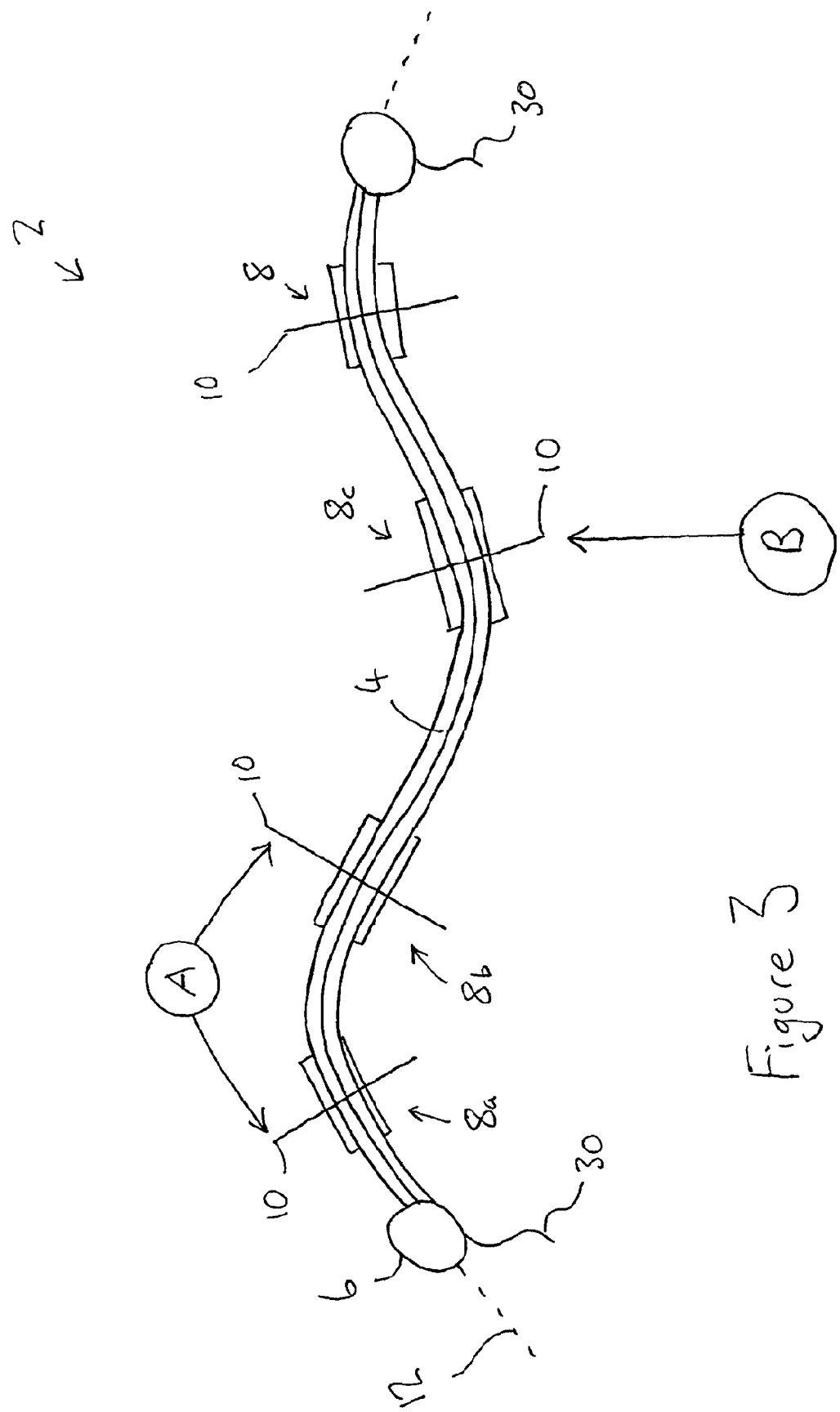
FIG. 3 is a view of the apparatus of FIG. 2 under the action of incident waves.

Referring to FIG. 3, there is shown the apparatus of FIG. 2 under the action of incident waves. Details of the apparatus 2 have been omitted for clarity. As shown, the flexible member 4 follows the surface 12 of the water as a wave passes the apparatus 2. This causes movement of the platforms 8, from which energy is generated. For example, energy may be generated by a generation system A coupled to the couplings 10 of different platforms 8a and 8b. In this way, generation system A generates energy from the relative movement between the platforms 8a and 8b, induced by the action of the wave. Alternatively, a generation system B may be employed to generate energy from the movement of a single platform 8c, as shown in FIG. 3. The platform 8c will rise and fall and rotate under the action of the incident waves, allowing energy to be generated from its motion. The generation systems A and B may be any suitable system that may be activated by the movement or relative movement of the platforms 8 and include pumps and compressors for generating a pressurised fluid, turbines, or electrical generators. Such systems may include means for converting reciprocal movement of the platforms 8 into rotary motion, for driving a generator or the like.

Figure 4:
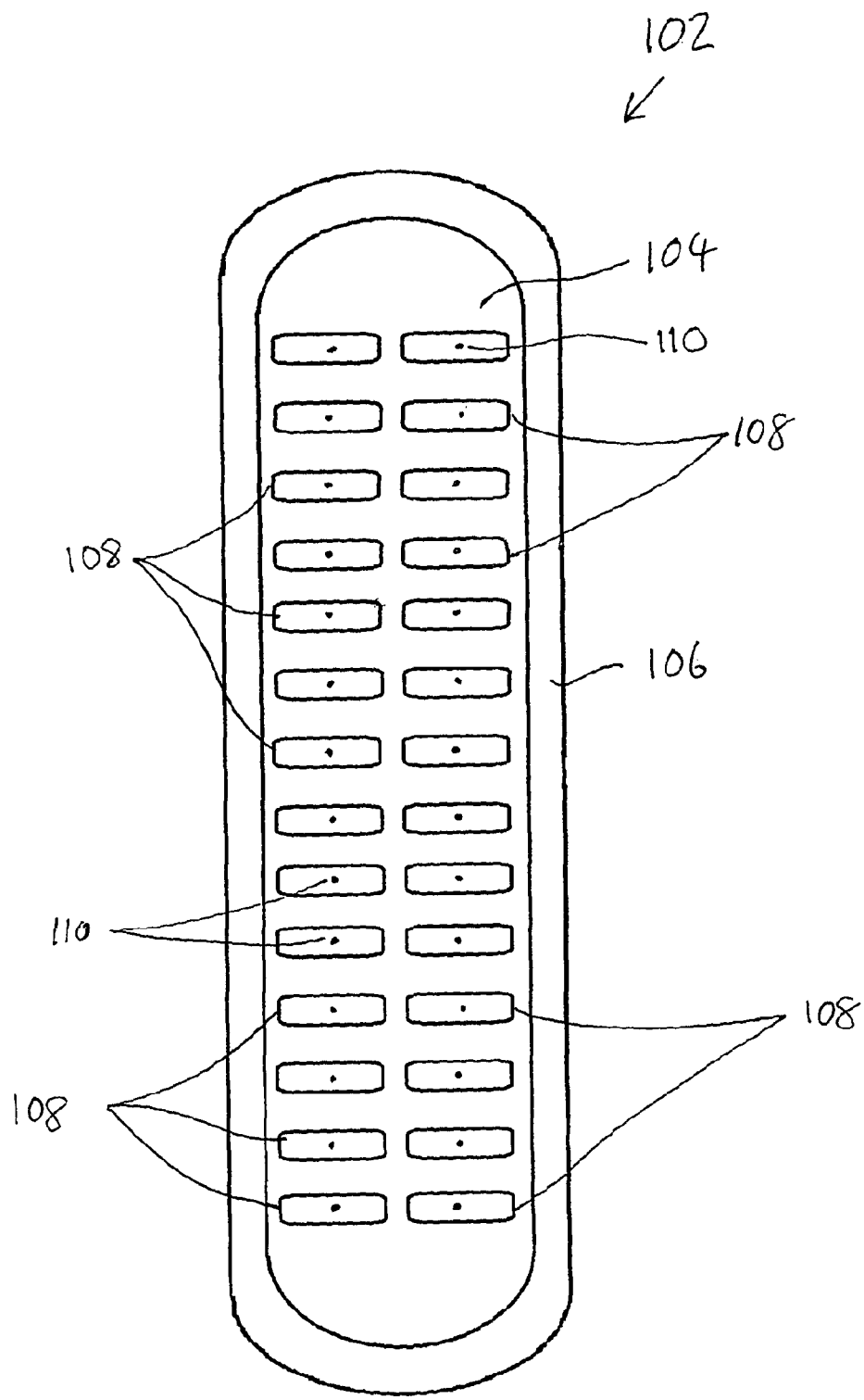
FIG. 4 is a plan view of an apparatus according to a second embodiment of the present invention.

Finally, referring to FIG. 4, there is shown a plan view of an apparatus according to a further embodiment of the present invention, generally indicated as 102. The apparatus 102 comprises an elongate flexible member 104, surrounded at its edge by a generally cylindrical buoyant barrier 106. The flexible member 104 is provided with a plurality of spaced apart rigid platforms 108. Each platform 108 is provided with a coupling 110, for connecting to a suitable means for generating energy from movement of the platform. Details of the apparatus 102 shown in FIG. 4 are analogous to those shown in FIGS. 2 and 3 and described hereinbefore.

The apparatus 102 of FIG. 4 is able to respond to and generate energy from waves travelling at all directions relative to the apparatus. Thus, waves travelling parallel to the longitudinal axis of the apparatus 102 will induce relative movement between the platforms 108 displaced axially along the flexible member. In addition, waves travelling perpendicular to the longitudinal axis will induce relative movement between adjacent platforms either side of the longitudinal axis. The apparatus 102 may be deployed singularly. Alternatively, an array may be provided comprising a plurality of the apparatus 102 arranged in end to end relationship and/or side by side, as required.

The invention claimed is:

1. An apparatus for generating energy from the action of waves in a body of water, the apparatus comprising:
   a single flexible planar member for extending across the surface of the body of water, the flexible member having an upper surface and a lower surface, which lower surface, in use, is in contact with the surface of the water, and an edge portion, said flexible member having a first portion of the upper surface and a second portion of the upper surface, said second portion being spaced apart from the first portion;

an energy generating system comprising a pump, compressor or generator coupled by a first coupling to said first portion of said upper surface of said flexible member and by a second coupling to said second portion of said upper surface of said flexible member, the energy generating system operable to generate energy from movement of the first portion of said flexible member relative to the second portion of said flexible member; and a skirt extending from the edge portion of the flexible member into the water, when in use.

2. The apparatus according to claim 1, wherein the apparatus has a neutral buoyancy.

3. The apparatus according to claim 1, wherein the apparatus comprises one or more buoyant members.

4. The apparatus according to claim 3, wherein the buoyant member is comprised in the flexible member.

5. The apparatus according to claim 4, wherein the buoyant member comprises a layer of the flexible member.

6. The apparatus according to claim 4, herein the buoyant member comprises one or more gas-filled chambers.

7. The apparatus according to claim 1, wherein the apparatus comprises one or more ballast members.

8. The apparatus according to claim 7, wherein the ballast member is comprised in the flexible member.

9. The apparatus according to claim 8, wherein the ballast member comprises a layer of the flexible member.

10. The apparatus according to claim 7, wherein the ballast member comprises one or more ballast chambers containing a ballast material.

11. The apparatus according to claim 10, wherein the ballast material is water and the ballast chamber comprises an opening to allow water to enter the chamber.

12. The apparatus according to claim 7, wherein the ballast member is in contact with the surface of the water in use.

13. The apparatus according to claim 1, further comprising a member to prevent water washing onto the upper surface of the flexible member, when in use.

14. The apparatus according to claim 13, wherein the means comprises a barrier extending along the edge portion of the flexible member.

15. The apparatus according to claim 1, further comprising an assembly for removing air from between the flexible member and the surface of the water when in use.

16. The apparatus according to claim 1, wherein the flexible member is provided with one or more rigid portions, each rigid portion comprising a platform, wherein the platform comprises an upper plate extending across the upper surface of the flexible member and a lower plate extending across the lower surface of the flexible member.

* * * * *